United States Patent Office 3,319,247
Patented May 9, 1967

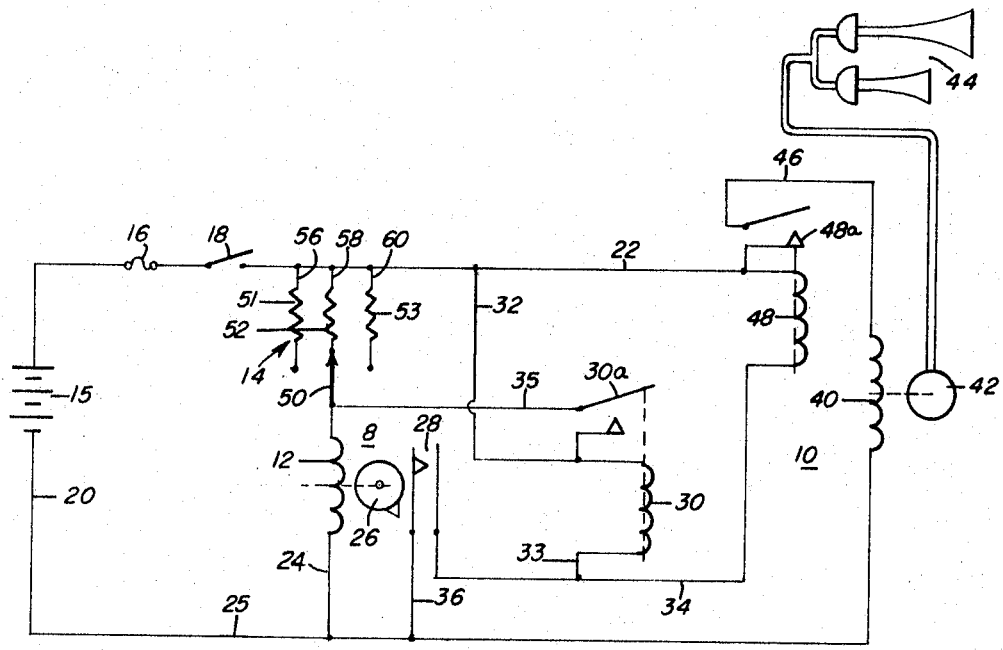

3,319,247
SOUND PRODUCING MECHANISM FOR
STARTLING BIRDS
Adolph Zajanc, Dixon, Calif., assignor to the United States of America as represented by the Secretary of the Interior
Filed Mar. 10, 1965, Ser. No. 438,795
2 Claims. (Cl. 340—404)

The invention herein described and claimed may be manufactured and used by or for the Government of the United States of America for governmental purposes without the payment of royalties thereon or therefore.

This invention relates to an improved apparatus for causing birds to dispel from areas where their presence is undesirable. More specifically, it involves an apparatus for producing at regular intervals blasts of sound which startle the birds and cause them to depart from the area protected by the apparatus.

Birds cause untold millions of dollars of damage to agricultural crops yearly. The improved apparatus is particularly useful for frightening birds from crops during that period when crops are most vulnerable to bird depredation. Trumpet-like horns of this apparatus are caused to send forth resounding blasts of sound over the area where the birds are likely to roost or feed on the crops. In addition to protecting agricultural crops the apparatus is applicable as an aid in clearing airports of hazardous birds. In general, the present invention can be used any place where birds constitute a destructive or dangerous nuisance.

The simplicity of the apparatus according to the invention allows it to be made and operated at relatively little expense. A small air compressor used in the apparatus is intermittently operated to furnish short air blasts to the horns which are oriented to direct their sound over the protected area. Sequencing of the compressor operation is automatically accomplished by a set of simple relays which are made operative at preset regular intervals by a conventional timing mechanism having an adjustable control device. Moreover, since there are relatively few moving mechanical parts in the apparatus, its trouble-free operation unattended in the outdoors, is normally practicable.

An object of the present invention is therefore to provide a sound producing means having utility as a pest control apparatus.

A further object of the present invention is to provide a simple apparatus for producing at predetermined regular intervals, loud blasts of sound that startle birds into scattering.

These and other objects of the invention will more fully appear from the following detailed description when read in connection with the accompanying drawing showing a schematic diagram of the electrical circuitry in which the several parts of the invention are connected to function as hereinafter explained.

The electrical means diagrammatically illustrated in the drawing are arranged to form a timing circuit 8 and a horn operating circuit 10. Comprising circuit 8 are a timing motor 12, and a settable switch device 14 for determining cyclic intervals of motor 12 operation which, as will be hereinafter more fully explained, establish the timing of the functional periods of the invention. Current is supplied to timing motor 12 from a source 15, by way of a branch circuit including a lead 20, conventional fuse 16 and a start switch 18, switch device 14, and further leads 24 and 25. A rotational drive from timer motor 12 is transmitted to a cam 26 whose singular lobe becomes effective to periodically close the contacts of a normally open switch 28. Also comprising timing circuit 8 is a relay 30 whose operating coil is energized from power source 15 through the contacts of switch 28 in a branch circuit constituted by leads 20, 32, 33, 34, 36 and 25. Timing motor 12 is thus made effective to maintain relay 30 operated for the periodic intervals of time in which the motor drive moves the lobe of cam 26 so as to close the contacts of switch 28. Responsive to the operation of relay 30, a branch circuit is completed through closed contacts 30a of the relay and leads 20, 32, 35, 24 and 25, which constitutes a shunt path around switch device 14 for the current from power source 15 energizing timing motor 12.

Horn operating circuit 10 facilitates the energization of a motor 40 which provides a drive to air compressor 42. The output of compressor 42 is supplied to a set of horn devices 44 wherefrom is produced the sound blasts which are effective to frighten the roosting or depredating birds as was hereinbefore explained. Motor 40 becomes operable in response to the activation of a further relay 48 whose contacts 48a are effective when closed to complete a power supply circuit to the motor. The operating coil of relay 48 is connected by way of leads 22 and 34, in a parallel circuit with the operating coil of relay 30. Consequently, both relay operating coils are energized during the time the switch 28 contacts are held closed by the action of cam 26. However, the power supply circuit for motor 40, comprising leads 20, 22, 46 and 25, which will thus be completed through contacts 48a, remains effective only as long as the switch 28 contacts are closed. For reasons to be hereinafter more fully explained, operation of motor 40 is thereby confined to that interval of time in which timing motor 12 is energized by current supplied in the shunt circuit completed through relay 30 contacts 30a.

With start switch 18 closed, a cycle of operation is to be considered initiated as the lobe of cam 26 leaves switch 28 so as to permit the switch contacts to open. This cycle is defined by the time in which cam 26 is driven one full revolution by timing motor 12, and includes first and second intervals during which the energizing circuit for the timing motor is completed through switch device 14, and the shunt circuit through contacts 30a, respectively. Switch device 14 provides a conductive path in a power supply circuit for timing motor 12 through a switch arm 50 which is settable to contact a selected one of three resistances 51, 52 and 53, of progressively decreasing resitance values, joined to the circuit by a set of parallel leads 56, 58 and 60, respectively. It is evident that the speed of timing motor 12 can therefore be determined by the setting of switch arm 50, whereby a lesser speed is obtained by the selection of a higher resistance. The duration of the operational cycle's first interval, which spans the time from the opening of the switch 28 contacts to the subsequent closure thereof, is thus settable by an adjustment of contact arm 50. The operational cycle's second interval, occurring during the time the switch 28 contacts are closed, finds relay 30 activated whereby the power supply circuit completed through relay contacts 30a shunts the resistance of switch device 14 to allow timing motor 12 to operate at a higher speed. Obviously, the second interval speed of timing motor 12 can also be made variable as desired by placing an appropriate resistance device for operation in a lead of the shunt circuit, such as lead 35.

The circuit arrangement heretofore described is operable on a continuing basis to cause horns 44 to produce sound blasts of predetermined duration at suitable preset intervals. Since compressor motor 40 is operable only when the contacts of switch 28 are closed, delivery of compressed air to horns 44 is limited to the time during the aforesaid second interval when timing motor 12 is energized for operation at its highest speed. Therefore, the sound blasts are produced during relatively short intervals, whose normally fixed duration is predetermined by the physical and operational characteristics of timing motor 12, cam 26 and switch 28, that are interrupted by relatively longer intervals of silence whose duration is preset by an adjustment of the contact arm 50 of switch device 14.

In an exemplary form of the invention, a sturdy metal container is employed to house a 12 volt direct current timer motor 12, and D.-C. motor driven air cocpressor 40, 42, electrically connected in the herinbefore described control circuit comprising a standard 12 volt storage battery power supply 15. On top of the container are mounted two trumpets 44, one eight and one-half inches long and the other six and one-half inches long, adapted to receive compressed air at connections joining thereto an air hose extending from an outlet on the air compressor in the container. The longer trumpet produces a basic level of 1000 cycles per second (c.p.s.), and the other 800 c.p.s., whereby the two trumpets together effectively produce a background sound of 4000 c.p.s. Switch device 14 is set to obtain cyclic operations of three minute intervals wherein the horns operate one to one and one-half seconds. Obviously, other operational intervals can be set as required by circumstances. The container is mounted upon a stand located in among the crops in the field so as to be situated about ten feet above the ground with the horns above the foliage to avoid muffling of the sound. A number of units according to the invention are usually placed at scattered points in the field to face their horns in different dierctions. Since the units are turned on at different times, the intervals between their blasts rarely coincide such that sounds from the different units are randomly staggered, and because of their arrangement can be heard from nearly all directions.

While a preferred embodiment of the invention has been specifically disclosed, it is to be understood that the invention is not limited thereby, but is susceptible to change in form and detail.

What is claimed is:

1. Apparatus for intermittently producing startling sounds comprising means operating a sound generator, means controlling said operating means comprising a pair of relays having the respective contacts thereof in separate circuits, and the respective operating coils thereof connected in individual parallel circuits, a continuously operated timing motor, a cam element rotatably driven by said motor, a power source, a normally open switch having contacts intermittently operated by said cam element, both of said individual parallel circuits to said relay operating coils including said normally open switch and said power source, an adjustable resistance connecting said power source with said timing motor wherein said motor is operated by energy from said power source passing through said adjustable resistance which is operable to control said timing motor at a selected predetermined speed during a first interval of time in accordance with the setting of said resistance, each closure of said normally open switch by said cam element completing said parallel circuits to activate said pair of relays whereby relay contacts closure caused by completion of one of said parallel circuits completes one of said separate circuits for connecting said power source to said sound generator operating means to produce said startling sounds, and relay contacts closure caused by completion of the other of said parallel circuits completes a second of said separate circuits for connecting said power source to said timing motor such that said adjustable resistance is by-passed and said timing motor runs at a further predetermined speed during a second interval of time.

2. The apparatus of claim 1 wherein said sound generator comprises a pair of horns and a means supplying compressed air thereto, and said means operating said sound generator is a motor operating said means supplying compressed air.

References Cited by the Examiner

UNITED STATES PATENTS

| 2,917,736 | 12/1959 | Marotta | 340—386 |
| 3,060,406 | 10/1962 | Wright | 340—404 X |
| 3,260,866 | 7/1966 | Martin | 307—141 |

FOREIGN PATENTS 585,238  10/1959  Canada.

NEIL C. READ, *Primary Examiner.*

I. J. LEVIN, *Assistant Examiner.*